(12) United States Patent
Tohta et al.

(10) Patent No.: US 12,025,072 B2
(45) Date of Patent: Jul. 2, 2024

(54) CONTROL METHOD AND CONTROL DEVICE FOR INTERNAL COMBUSTION ENGINE FOR VEHICLE

(71) Applicant: NISSAN MOTOR CO., LTD., Yokohama (JP)

(72) Inventors: Yuzuru Tohta, Kanagawa (JP); Kohei Kamiya, Kanagawa (JP); Noriaki Ejiri, Kanagawa (JP); Tomoaki Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/917,747

(22) PCT Filed: Apr. 8, 2020

(86) PCT No.: PCT/JP2020/015822
§ 371 (c)(1),
(2) Date: Oct. 7, 2022

(87) PCT Pub. No.: WO2021/205567
PCT Pub. Date: Oct. 14, 2021

(65) Prior Publication Data
US 2023/0160354 A1 May 25, 2023

(51) Int. Cl.
*F02D 41/40* (2006.01)
*F02D 41/02* (2006.01)
*F16H 61/14* (2006.01)

(52) U.S. Cl.
CPC ....... *F02D 41/401* (2013.01); *F02D 41/0235* (2013.01); *F16H 61/143* (2013.01); *F02D 2200/501* (2013.01); *F02D 2200/60* (2013.01); *F16H 2061/145* (2013.01)

(58) Field of Classification Search
CPC ............... F02D 41/401; F02D 41/0235; F02D 2200/501; F02D 2200/60; F16H 61/143; F16H 2061/145
See application file for complete search history.

(56) References Cited

U.S. PATENT DOCUMENTS

| | | | |
|---|---|---|---|
| 5,616,100 A | 4/1997 | Sakai et al. | |
| 2004/0043863 A1 | 3/2004 | Kondo et al. | |
| 2015/0032349 A1* | 1/2015 | Sato | F16D 33/18 701/68 |
| 2017/0120918 A1* | 5/2017 | Tohta | B60W 30/18072 |
| 2021/0293167 A1* | 9/2021 | Kaneko | B60W 30/20 |

FOREIGN PATENT DOCUMENTS

| | | |
|---|---|---|
| JP | 08-178056 A | 7/1996 |
| JP | 2004-084830 A | 3/2004 |
| JP | 2014-185732 A | 10/2014 |

* cited by examiner

*Primary Examiner* — Lori Wu
(74) *Attorney, Agent, or Firm* — Foley & Lardner LLP (57) ABSTRACT

A control method is provided for controlling an internal combustion engine for a vehicle configured to engage a lockup clutch during a fuel cut, and to decrease a lockup hydraulic pressure at a fuel cut recovery to bring the lockup clutch to a slip engagement. The control method includes estimating a torque of the internal combustion engine generated by the fuel cut recovery when a fuel cut recovery condition is satisfied. The control method further includes decreasing a decrease amount of the lockup hydraulic pressure as the torque is greater.

6 Claims, 4 Drawing Sheets

CONTROL METHOD AND CONTROL DEVICE FOR INTERNAL COMBUSTION ENGINE FOR VEHICLE

TECHNICAL FIELD

This invention relates to a control of a fuel cut and a fuel cut recovery of an internal combustion engine for a vehicle, and specifically to a control method and a control device of the internal combustion engine for the vehicle configured to bring the lockup clutch to a slip engagement to decrease a shock at the fuel cut recovery.

BACKGROUND ART

It is known that when an accelerator opening degree becomes zero during a traveling, a stop of the fuel supply, that is, the fuel cut is performed in accordance with a predetermined fuel cut permission condition, so as to decrease the fuel consumption of the internal combustion engine for the vehicle. After the fuel cut, the fuel cut recovery, that is, the fuel injection is restarted in accordance with the fuel cut recovery condition such as the depression of the accelerator pedal, and the decrease of the engine speed to be equal to or smaller than a predetermined recovery rotation speed.

At the fuel cut recovery, the torque transmitted from the internal combustion engine to a vehicle driving system is inverted from negative to positive, so that the shock is generated in the vehicle. A patent document 1 discloses that the lockup clutch of the torque converter is controlled from a full engagement to a slip engagement so as to suppress the shock, and that the fuel injection restart is performed in a state in which the lockup clutch is slipped.

However, the art of the patent document 1 does not consider a torque step of the internal combustion engine before and after the fuel injection restart execution.

For example, when an additional torque is added as the generation torque of the internal combustion engine to the torque necessary for the traveling of the vehicle for some reason, the fuel cut recovery is performed to target the relatively large torque at the fuel cut recovery after the fuel cut. Accordingly, the torque step is largely generated. Therefore, when the lockup hydraulic pressure decreasing amount for bringing to the slip engagement is set to a constant value, the slippage of the lockup clutch becomes excessive when the large torque is generated by the fuel injection restart. The unfavorable phenomenon of the sudden increase of the engine speed of the internal combustion engine is generated.

That is, in the conventional art, when the relatively large torque is generated at the fuel cut recovery, the unnecessary large slippage of the lockup clutch is provided.

PRIOR ART DOCUMENT

Patent Document

Japanese Patent Application No. 2004-84830

SUMMARY OF THE INVENTION

The present invention includes: estimating a torque of the internal combustion engine generated by the fuel cut recovery when a fuel cut recovery condition is satisfied; and decreasing a decrease amount of the lockup hydraulic pressure as the torque is greater.

The torque transmission capacity of the lockup clutch is determined in accordance with the decreasing amount of the lockup hydraulic pressure. That is, when the lockup hydraulic pressure is decreased, the torque transmission capacity is decreased. Accordingly, the slippage is generated by the torque generated in accordance with the fuel cut recovery. The shock at the fuel cut recovery is decreased by the slippage of the lockup clutch.

When the torque of the internal combustion engine generated by the fuel cut recovery is large, the slippage is generated even when the decreasing amount of the lockup hydraulic pressure is small. Accordingly, it is possible to decrease the shock. Therefore, the decreasing amount of the lockup hydraulic pressure is decreased as the generated torque is greater. With this, it is possible to attain the appropriate torque transmission capacity, and to decrease the shock while suppressing the unnecessary sudden increase of the engine speed of the internal combustion engine.

DESCRIPTION OF EMBODIMENTS

Hereinafter, one embodiment according to the present invention is explained with reference to the drawings.

Figure 1:
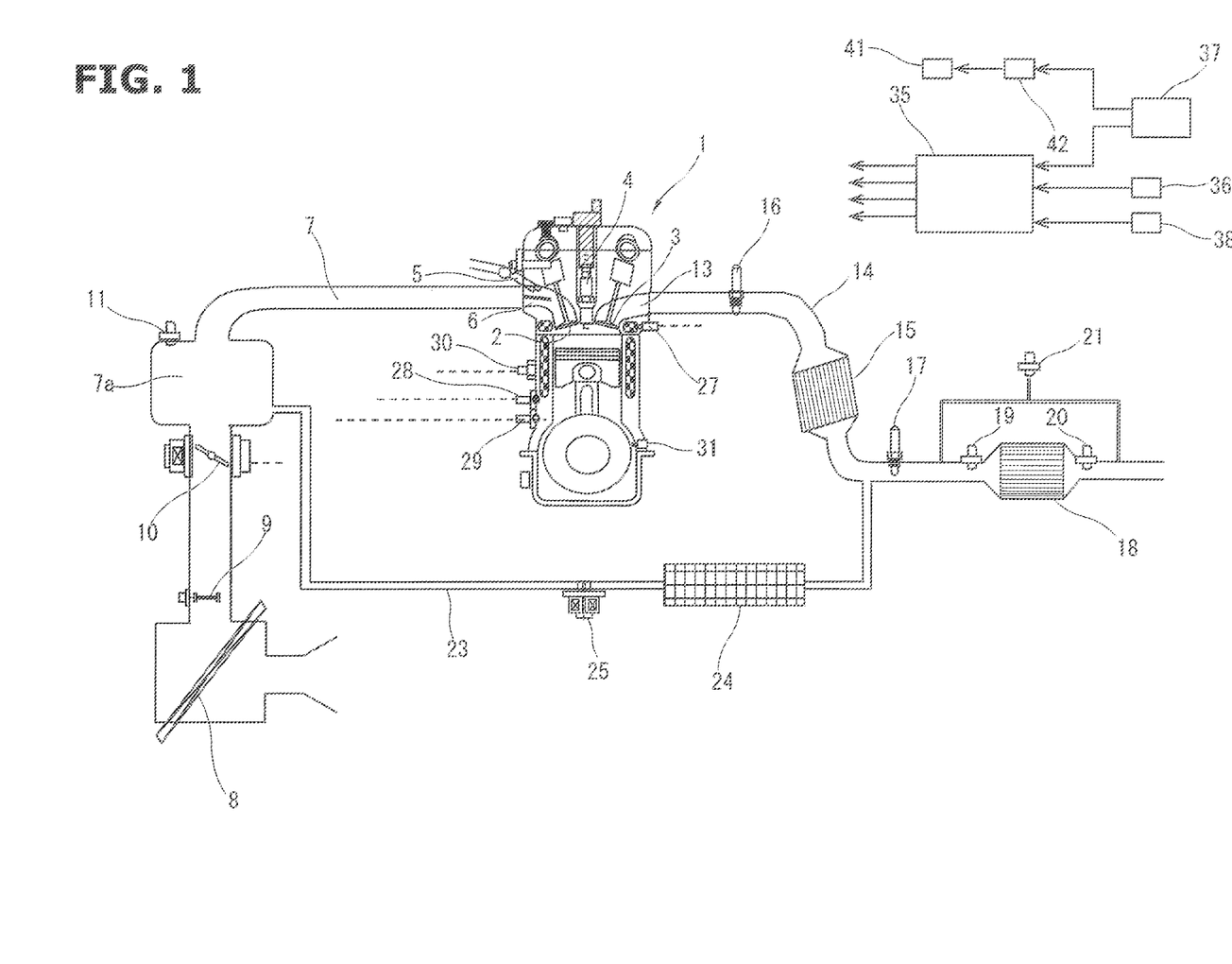
FIG. 1 is an explanation view showing a system configuration of an internal combustion engine according to one embodiment.

FIG. 1 is an explanation view schematically showing a system configuration of an internal combustion engine 1 according to the one embodiment. The internal combustion engine 1 is, for example, an in-line three cylinder internal combustion engine of a spark ignition type. The internal combustion engine 1 includes a spark plug 4 provided at a central portion of a combustion chamber surrounded by an intake valve 2 and an exhaust valve 3; and a variable valve timing mechanism (not shown) provided to the intake valve 2 side. A fuel injection valve 5 is disposed to an intake port 6. The fuel injection valve 5 is configured to inject the fuel toward the intake valve 2. Besides, the internal combustion engine 1 may be a cylinder direction injection type internal combustion engine configured to directly inject the fuel into the cylinder.

An intake passage 7 is connected to the intake port 6. The intake passage includes an intake collector 7a. An air cleaner 8, an air flow meter 9, and an electronic control type throttle valve 10 are disposed in this order from the upstream side on the upstream side of the intake collector 7a. A T-MAP sensor 11 is provided to the intake collector 7a. The T-MAP sensor 11 is configured to sense a pressure and an intake air temperature within the intake collector 7a.

A catalyst device 15 made from the three-way catalyst is provided to an exhaust passage 14 connected to an exhaust port 13. An air fuel ratio sensor 16 is disposed on the upstream side of the catalyst device 15. An O2 sensor 17 is disposed on a downstream side of the catalyst device 15. An exhaust particulate filter (hereinafter, referred to as GPF) 18 is disposed on the downstream side of the O2 sensor 17 in the exhaust passage 14. The GPF 18 is configured to collect the exhaust particulates in the exhaust gas. The GPF 18 has, for example, a configuration in which a monolithic filter of the sealing type that is made from the ceramic is coated with the three-way catalyst. In one example, the catalyst device 15 on the upstream side is positioned within an engine room of the vehicle. The GPF 18 is positioned on an underfloor of the vehicle.

Temperature sensors 19 and 20 are provided on an inlet side and outlet side of the GPF 18. Moreover, a pressure difference sensor 21 is provided to respond a pressure difference between the inlet side and the outlet side of the GPF 18, and thereby to sense a pressure loss in the GPF 18 (that is, the particulate deposition state).

An exhaust recirculation passage 23 is provided between the exhaust passage 14 and the intake passage 7. This exhaust recirculation passage 23 is provided with an EGR gas cooler 24 and an EGR valve 25.

Moreover, a cooling water temperature sensor 27, an oil temperature sensor 28 and a hydraulic sensor 29 which relate to a lubrication oil, a knocking sensor 30, a crank angle sensor 31 configured to sense an engine speed, and so on.

The detection signals of the above-described various sensors are inputted to an engine controller 35. Moreover, the engine controller 35 receives a detection signal of an accelerator opening degree sensor 36 configured to sense a depression amount of an accelerator pedal operated by a driver, a signal representing a gear ratio of a transmission outputted by a transmission controller 37, a vehicle speed signal from a vehicle speed sensor 38, and so on. Furthermore, the internal combustion engine 1 is configured to drive an air conditioner compressor (not shown) and an alternator (not shown) which are auxiliary devices. The engine controller 35 receives signals representing a refrigerant pressure of the air conditioner, and a current of the alternator, so as to sense the load necessary for driving these auxiliary devices.

The engine controller 35 is configured to perform an overall control of the internal combustion engine 1 based on these detection signals. For example, the engine controller 35 is configured to optimally control the fuel injection amounts and the injection timings of the fuel injection valves 5 of the cylinders, the ignition timing of the spark plug 4, the opening degree of the throttle valve 10, and so on.

Moreover, when the pressure difference sensor 21 senses the particulate deposition state greater than a predetermined level (that is, the clogging state), the engine controller 35 is configured to forcibly regenerate the GPF 18 in consideration of the other conditions such as the temperature of the GPF 18. Specifically, the engine controller 35 is configured to increase the opening degree of the throttle valve 10, and thereby to increase the intake air amount and the fuel amount. Furthermore, the engine controller 35 is configured to raise the exhaust gas temperature by retarding the ignition timing, and thereby to combust and remove the deposited exhaust particulates. Besides, in general, when the temperature of the GPF 18 is high due to the high load traveling, it is possible to naturally regenerate the GPF 18. Accordingly, when the temperature of the GPF 18 is low due to the continuation of the low load driving, and so on, the forcible regeneration of the GPF 18 is performed. For example, when the driver releases the accelerator pedal to bring the accelerator opening degree to zero, the forcible regeneration of the GPF 18 is performed.

The internal combustion engine 1 is mounted on the vehicle in combination with a torque converter (not shown) and the automatic transmission. The automatic transmission may be a stepped transmission or a continuously variable transmission. In one example, a belt type continuously variable transmission (that is, CVT) is used as the automatic transmission. A transmission controller 37 is configured to continuously control a transmission gear ratio of this belt type continuously variable transmission mainly based on the accelerator opening degree and the vehicle speed. The output shaft (the crank shaft) of the internal combustion engine 1 is connected through the torque converter (not shown) to the input shaft of the transmission. The output shaft of the transmission is configured to drive the driving wheels of the vehicle through a final speed reduction gear and a drive shaft. The torque converter includes a lockup clutch 41 configured to connect the input side and the output side of the torque converter. This lockup clutch 41 is configured to be controlled to three states of an engagement (full engagement), a slip engagement, and a disengagement by a lockup hydraulic pressure supplied through a hydraulic control unit 42. The hydraulic control unit 42 is controlled by the transmission controller 37.

Next, a fuel cut control and a fuel cut recovery control at a deceleration which are main parts of the present invention are explained. The internal combustion engine 1 according to the embodiment is configured to perform the fuel cut at the coast (inertia) traveling at which the driver releases the accelerator pedal during the traveling of the vehicle so as to improve the fuel consumption, and to ensure the engine braking, and so on. Specifically, when the accelerator opening degree becomes zero, it is judged whether or not fuel cut permission conditions which are other than the accelerator opening degree are satisfied. When all the conditions are satisfied, the fuel cut is permitted. For example, the fuel cut permission conditions are that the cooling water temperature is equal to or greater than a predetermined temperature, that the engine speed of the internal combustion engine 1 is equal to or greater than a predetermined rotation speed, that the vehicle speed is equal to or greater than a predetermined vehicle speed, and so on. When these conditions are satisfied, the fuel cut is permitted.

In this case, the accelerator opening degree is zero immediately before performing the actual fuel cut (the injection stop). However, for example, when the forcible regeneration of the GPF 18 is performed, the torque of the internal combustion engine 1 immediately before the fuel cut is relatively large. This is because the additional torque for the forcible regeneration of the GPF 18, that is, the intake air amount and the fuel amount are added to the torque necessary for the idling drive. That is, even when the accelerator opening degree operated by the driver becomes zero, the opening degree of the throttle valve 10 is not in the fully close state during the regeneration of the GPF 18. The opening degree of the throttle valve 10 becomes the open state to some extent. Accordingly, the torque of the internal combustion engine 1 immediately before the fuel cut becomes high. The similar phenomenon may be generated when the loads of the auxiliary devices such as the compressor of the air conditioner, and the alternator for the electric power generation are large, when the inflow of the purge gas from the canister is large, or when the loss due to the friction and so on is large so that the generation torque of the internal combustion engine 1 is controlled to the large torque. For example, when the load of the auxiliary device is large, and when the forcible regeneration of the GPF 18 is performed at the same time, the torque of the internal combustion engine 1 becomes large accordingly. After the judgment of the fuel cut permission, the fuel cut is actually performed, so that the torque of the internal combustion engine 1 becomes zero.

During the coast traveling with the fuel cut, the lockup clutch 41 is controlled to the engagement state. With this, it is possible to surely obtain the engine brake of the internal combustion engine 1.

When the predetermined fuel cut recovery condition is satisfied during the coast traveling with the fuel cut, the fuel cut recovery, that is, the fuel injection is restarted. The fuel cut recovery condition is, for example, that the accelerator opening degree is not zero (that is, the accelerator pedal depression), that the engine speed of the internal combustion engine 1 becomes equal to or smaller than the predetermined rotation speed, that the vehicle speed becomes equal to or smaller than the predetermined vehicle speed, and so on. When one of these conditions is satisfied, the fuel cut recovery is performed.

At this fuel cut recovery, the lockup clutch 41 is controlled to the slip engagement state before the restart of the actual fuel injection so as to suppress the shock of the vehicle in accordance with the increase of the torque of the internal combustion engine 1. That is, when it is judged that the fuel cut recovery condition is satisfied, the lockup hydraulic pressure is decreased. The fuel injection restart is performed after the lockup clutch 41 is brought to the slip engagement. The torque of the internal combustion engine 1 is increased by this fuel injection restart. However, the vibration is absorbed by the slippage of the lockup clutch 41. It is possible to decrease the shock generated through the driving system of the vehicle.

The torque of the internal combustion engine 1 at the fuel injection restart is obtained by adding the additional torque necessary for the some reason to the torque necessary for the idling drive, similarly to the above-described torque immediately before the fuel cut. For example, when the fuel cut is performed in a state in which the forcible regeneration of the GPF 18 is not finished, the regeneration of the GPF 18 is continued after the fuel cut recovery. Accordingly, the target torque at the fuel cut recovery is set in consideration of the torque necessary for the regeneration of the GPF 18, that is, the intake air amount and the fuel amount. The loads of the auxiliary devices such as the compressor of the air conditioner, and the alternator of the electric power generation, and so on are similarly considered. Accordingly, the torque of the internal combustion engine 1 generated by the fuel cut recovery is not constant. The torque of the internal combustion engine 1 is relatively largely varied by whether or not the GPF 18 is regenerating, and so on.

In a case in which the lockup clutch 41 is in the slip engagement state, the slippage is generated when the actual torque exceeds the torque transmission capacity which is variably controlled by the lockup hydraulic pressure. Accordingly, when the torque of the internal combustion engine 1 generated by the fuel cut recovery is large, it is possible to generate the slippage of the lockup clutch 41 when the decrease amount of the lockup hydraulic pressure is small.

Accordingly, in this embodiment, the decreasing amount of the lockup hydraulic pressure is decreased as the torque generated by the fuel cut recovery is greater. Consequently, the slippage is generated at the early timing. Therefore, the timing of the fuel injection restart is set to an earlier timing as the torque generated by the fuel cut recovery is greater.

Figure 2:
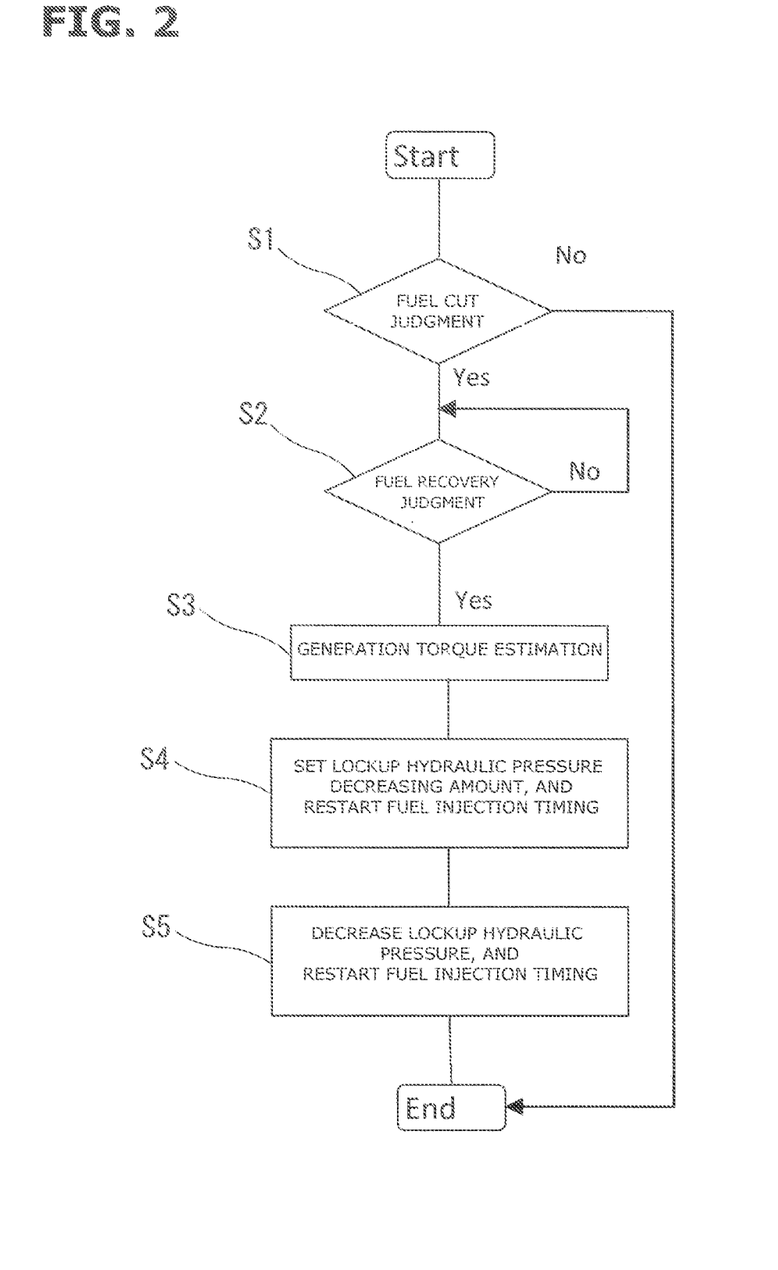
FIG. 2 is a flowchart showing an operation of a fuel cut recovery control according to the one embodiment.

FIG. 2 is a flowchart showing a flow of the operation of the fuel cut recovery control performed by the engine controller 35. At step 1, it is repeatedly judged whether or not the fuel cut is performed. When the fuel cut is not performed, the process is finished.

When the fuel cut is performed, the process proceeds to step 2. It is judged whether or not the fuel cut recovery condition is satisfied. When the fuel cut recovery condition is not satisfied, the fuel cut is continued. As described above, the fuel cut recovery condition is, for example, that the idling switch is the OFF state (the accelerator opening degree is not zero), that the engine speed of the internal combustion engine 1 is equal to or smaller than the predetermined rotation speed, or that the vehicle speed is equal to or smaller than the predetermined vehicle speed.

When the fuel cut recovery condition is satisfied, the process proceeds from step 2 to step 3. The torque of the internal combustion engine 1 generated by the fuel cut recovery is estimated (presumed). The torque generated by the fuel cut recovery is the target torque at the actual fuel injection restart. For example, the target torque of the internal combustion engine 1 at the fuel cut recovery is determined based on the accelerator opening degree, the engine speed of the internal combustion engine 1, whether or not the forcible regeneration of the GPF 18 is continued, the load of the auxiliary device, and so on.

Next, the process proceeds to step 4. The lockup hydraulic pressure decreasing amount is determined in accordance with the torque estimated at step 3. That is, the target slip engagement hydraulic pressure is set to attain the torque transmission capacity according to the estimated generation torque. In this case, the target slip engagement hydraulic pressure is increased as the estimated torque is greater.

An execution timing of the fuel injection restart is determined in accordance with the estimated torque. In this case, the execution timing of the fuel injection restart is determined to correspond to the time required to be decreased to the target slip engagement hydraulic pressure from the start of the lockup hydraulic pressure decrease. The necessary lockup hydraulic pressure decreasing amount is decreased as the estimated torque is greater. Accordingly, the execution timing of the fuel injection restart is set to the earlier timing as the estimated torque is greater.

Next, the process proceeds to step 5. The lockup hydraulic pressure decrease and the fuel injection restart are performed in accordance with the determination of step 4. Specifically, the lockup hydraulic pressure decrease is started substantially at the same time of the satisfaction of the fuel cut recovery condition. Then, when it reaches the timing determined at step 4, the fuel injection restart is performed.

Figure 3:
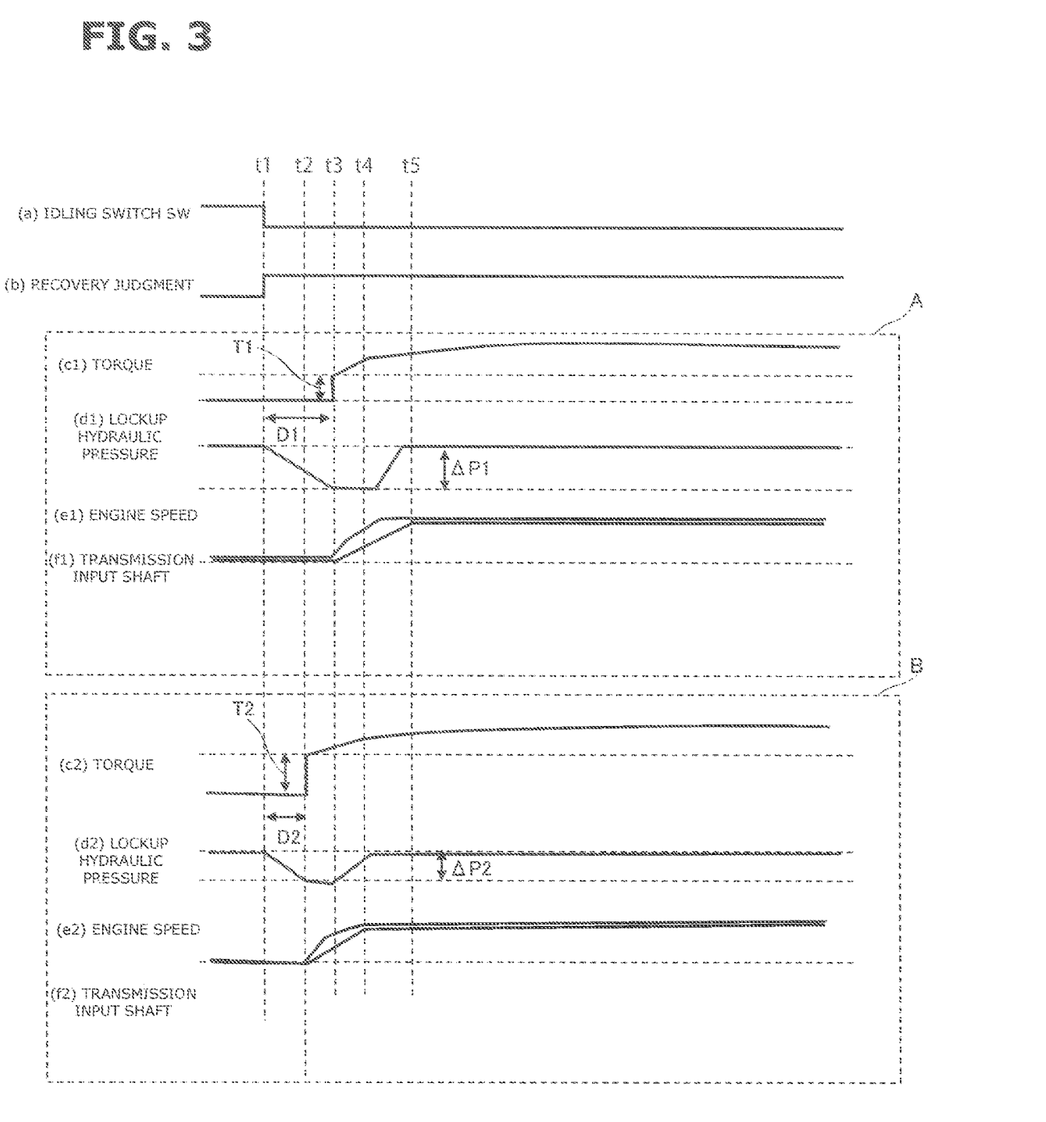
FIG. 3 is a time chart showing variations of a lockup hydraulic pressure, an internal combustion engine speed, and a transmission input shaft rotation speed when the torque generated at the fuel cut recovery is small and large.

FIG. 3 is a time chart showing variations of the torque of the internal combustion engine 1, the lockup hydraulic pressure, the engine speed of the internal combustion engine 1, and the transmission input shaft rotation speed at the fuel cut recovery. In the drawing, a characteristic a represents an idling switch flag. A characteristic b represents a fuel cut recovery judgment flag. A characteristic surround by a dotted line A is a characteristic when the generation torque of the internal combustion engine 1 at the fuel cut recovery is relatively small. A characteristic c1 represents the torque of the internal combustion engine 1. A characteristic d1 represents the lockup hydraulic pressure. A characteristic e1 represents the engine speed of the internal combustion engine 1. A characteristic f1 represents the transmission input shaft rotation speed. Moreover, a characteristic surrounded by a dotted line B is a characteristic when the generation torque of the internal combustion engine 1 at the fuel cut recovery is relatively large. A characteristic c2 represents the torque of the internal combustion engine 1. A characteristic d2 represents the lockup hydraulic pressure. A characteristic e2 represents the engine speed of the internal combustion engine 1. A characteristic f2 represents the transmission input shaft rotation speed. Besides, one factor of the increase of the generation torque of the internal combustion engine 1 at the fuel cut recovery is that the forcible regeneration of the GPF 18 is performed. For example, the characteristic of the part surrounded by the dotted line A corresponds to a case in which the forcible regeneration of the GPF 18 is not performed. The characteristic of the part surrounded by the dotted line B corresponds to a case in which the forcible regeneration of the GPF 18 is performed.

The idling switch flag shown by the characteristic a is a flag representing that the accelerator opening degree is zero. When a state in which the output signal of the accelerator opening degree sensor 36 configured to respond to the depression of the accelerator pedal is smaller than a predetermined level is continued during a relatively short time period, it is judged that the accelerator pedal is fully closed, so that the accelerator switch flag becomes ON, that is, "1". When the accelerator opening degree is values other than zero, the idling switch flag becomes "0". In the example shown in the drawing, the accelerator pedal is slightly depressed at time t1, so that the idling switch flag becomes "0".

When the idling switch flag becomes "0", the fuel cut recovery judgment flag representing the satisfaction of the fuel cut recovery condition becomes "1" substantially at the same time.

The decrease of the lockup hydraulic pressure is started in accordance with this fuel cut recovery judgment. That is, the lockup hydraulic pressure is decreased substantially from time t1. Specifically, as described above, the torque of the internal combustion engine 1 generated by the fuel cut recovery is estimated at the satisfaction of the fuel cut recovery condition. The target slip engagement hydraulic pressure is determined in accordance with this estimated torque. The target slip engagement hydraulic pressure is determined in accordance with the estimated torque. Then, the lockup hydraulic pressure is gradually decreased at a constant decreasing rate toward this target slip engagement hydraulic pressure.

When the generation torque of the internal combustion engine 1 at the fuel cut recovery is relatively small, the target slip engagement hydraulic pressure is set to the relatively low value as shown in the characteristic d1. $\Delta P1$ is the hydraulic pressure decrease amount of the lockup hydraulic pressure. In the example shown in the drawing, the lockup hydraulic pressure reaches the target slip engagement hydraulic pressure at time t3.

The actual fuel injection restart is performed in a state in which the slippage of the lockup clutch 41 may be generated. Accordingly, the fuel injection is restarted at the fuel injection restart execution timing to correspond to the timing at which the lockup hydraulic pressure is decreased to the slip engagement hydraulic pressure. In the example shown in the drawing, the fuel injection is restarted at time t3. The torque of the internal combustion engine 1 is increased as shown in the characteristic c1 (torque T1). With this, the engine speed of the internal combustion engine 1 is increased as shown in the characteristic e1. The transmission input shaft rotation speed is also increased as shown in the characteristic f1. The transmission input shaft rotation speed is increased by the slippage of the lockup clutch 41 which is in the slip engagement state so as to be lower than the engine speed of the internal combustion engine 1.

After the fuel cut recovery, the lockup hydraulic pressure is controlled to be gradually increased, so that the lockup clutch 41 is brought to the engagement state (the full engagement state) again. In the example shown in the drawing, the lockup clutch 41 is in the full engagement state at time t5.

When the generation torque of the internal combustion engine 1 at the fuel cut recovery is relatively large, the target slip engagement hydraulic pressure is set to the relatively high value as shown in the characteristic d2. $\Delta P2$ is the hydraulic pressure decreasing amount of the lockup hydraulic pressure. Accordingly, the lockup hydraulic pressure reaches the target slip engagement hydraulic pressure at time t2 earlier than time t3. On the other hand, when the torque of the internal combustion engine 1 at the fuel cut recovery is large, the fuel injection restart execution timing is set to the earlier timing to correspond to the timing at which the lockup hydraulic pressure is decreased to the target slip engagement hydraulic pressure. In the example shown in the drawing, the fuel injection restart is performed at time t2 at which the lockup hydraulic pressure reaches the target slip engagement hydraulic pressure. The torque of the internal combustion engine 1 is increased as shown in the characteristic c2 (torque T2). With this, the engine speed of the internal combustion engine 1 is increased as shown in the characteristic e2. The transmission input shaft rotation speed is also increased as shown in the characteristic f2. The transmission input shaft rotation speed is increased by the slippage of the lockup clutch 41 which is in the slip engagement state so as to be lower than the engine speed of the internal combustion engine 1.

After the fuel cut recovery, the lockup hydraulic pressure is controlled to be gradually increased, so that the lockup clutch 41 is brought to the engagement state (the full engagement state) again. In the example shown in the drawing, the lockup clutch 41 is in the full engagement state at time t4 earlier than time t5 in the case in which the torque of the internal combustion engine 1 is small.

In this way, in this embodiment, the target slip engagement hydraulic pressure is set in accordance with the torque of the internal combustion engine 1 generated by the fuel cut recovery. Accordingly, it is possible to generate the appropriate slippage at the increase of the torque of the internal combustion engine by the fuel cut recovery. For example, when the lockup hydraulic pressure is excessively decreased in a case in which the generation torque of the internal combustion engine 1 is large, the excessive slippage is generated. Consequently, the unfavorable phenomenon of the sudden increase (the racing) of the engine speed of the internal combustion engine 1 at the fuel cut recovery is generated. On the other hand, in a case in which the lockup hydraulic pressure is not sufficiently decreased when the generation torque of the internal combustion engine 1 is small, it is not possible to obtain the sufficient slippage of the lockup clutch 41 at the fuel cut recovery, and thereby to sufficiently decrease the shock.

Moreover, the target slip engagement hydraulic pressure is set in accordance with the generation torque of the internal combustion engine 1. With this, it is possible to perform the fuel injection restart at the relatively earlier timing when the generation torque is large. That is, the fuel injection restart execution timing is set in accordance with the setting of the target slip engagement hydraulic pressure in accordance with the generation torque. With this, it is possible to ensure the shock decrease due to the slippage of the lockup clutch 41, and furthermore to minimize the delay (D1 and D2 in FIG. 3) of the execution timing of the actual fuel injection restart from the judgment of the fuel cut recovery.

Moreover, the timing at which the lockup clutch 41 is returned to the full engagement after the fuel cut recovery becomes relatively earlier when the generation torque is large. The slip engagement is not continued during the unnecessary long time period.

Besides, in the time chart of FIG. 3, the fuel cut recovery by the depression of the accelerator pedal is explained. However, it is similar to the fuel cut recovery by the other fuel cut recovery condition.

Figure 4:
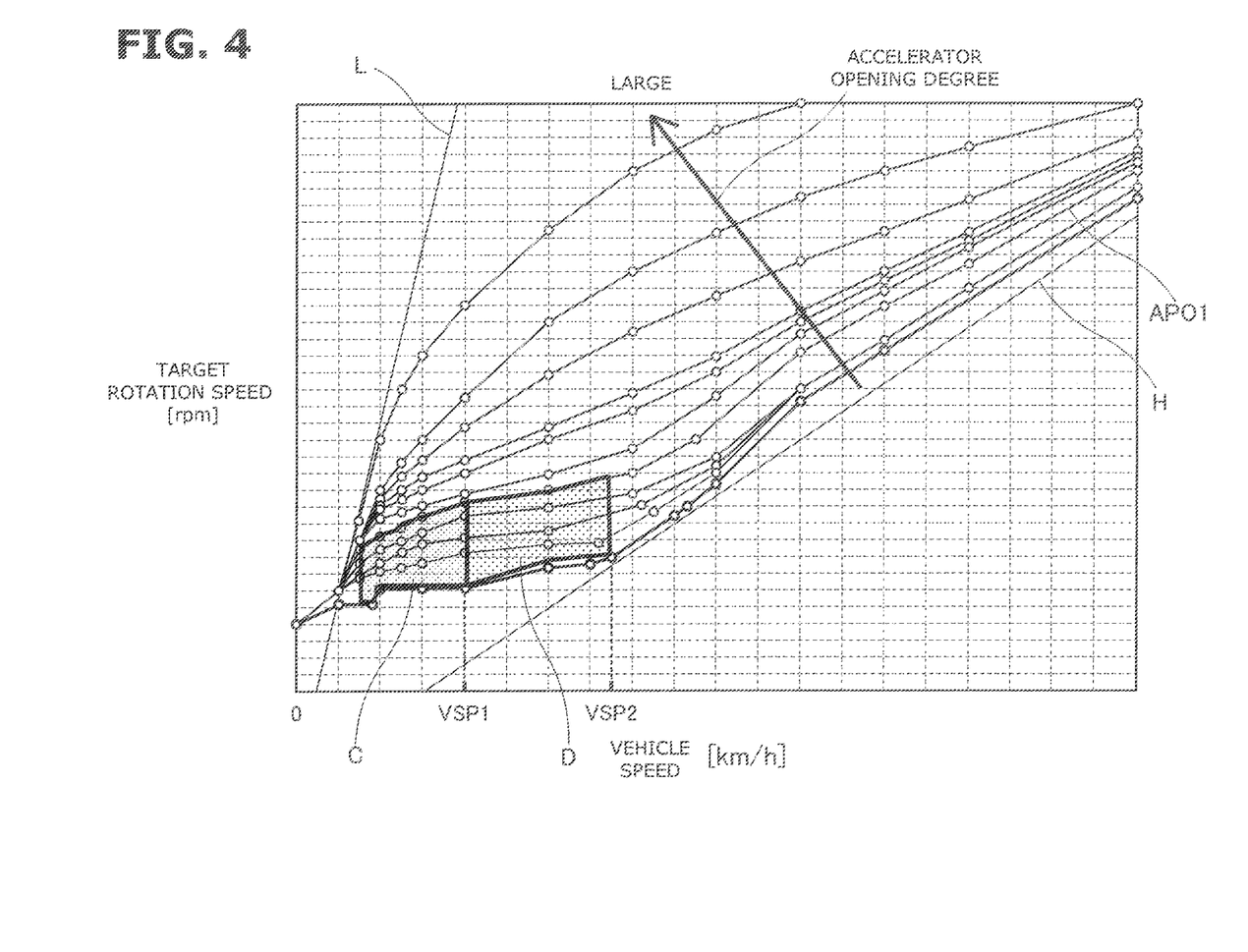
FIG. 4 is a shift diagram showing a driving region of a vehicle configured to perform the slip engagement control of the lockup clutch.

Next, FIG. 4 is a shift diagram showing a driving region of the vehicle performing the above-described slip engagement control of the lockup clutch 41, The transmission gear ratio of the belt type continuously variable transmission (CVT) (not shown) connected to the internal combustion engine 1 is controlled in accordance with the vehicle speed and the accelerator opening degree (the accelerator pedal depression amount). FIG. 4 is the shift diagram showing the transmission gear ratio with respect to the representative accelerator opening degree. In FIG. 4, a horizontal axis is the vehicle speed. A vertical axis is the target rotation speed (the transmission input shaft rotation speed). As shown in the drawing, the transmission gear ratio is varied in a region between a lowest line L and a highest line, which is the transmission gear ratio region attainable in the CVT. The characteristic line becomes the upper left side in the drawing as the accelerator opening degree is greater. That is, the transmission gear ratio becomes lower transmission gear ratio as the accelerator opening degree is greater.

In this case, in this embodiment, the vehicle driving regions in which the slip engagement control is performed are different in accordance with the generation torque of the internal combustion engine 1 at the fuel cut recovery. Specifically, when the forcible regeneration of the GPF 18 which is one factor of the increase of the generation torque of the internal combustion engine 1 at the fuel cut recovery is not performed (corresponding to the above-described A in FIG. 3), the slip engagement control of the lockup clutch 41 is performed in a region C in which the accelerator opening degree at the fuel cut recovery is equal to or smaller than a relatively small predetermined opening degree (APO1), and in which the vehicle speed is equal to or smaller than a relatively low first vehicle speed (VSP1). In other region, the lockup clutch 41 is rapidly engaged without the slip engagement control. This is because the acceleration response is required relative to the shock decrease at the fuel cut recovery when the accelerator opening degree is large, and because the shock at the fuel cut recovery is difficult to become apparent relatively when the vehicle speed is high.

On the other hand, when the forcible regeneration of the GPF 18 which is one factor of the increase of the generation torque of the internal combustion engine 1 at the fuel cut recovery is performed (corresponding to the above-described B in FIG. 3), the slip engagement control of the lockup clutch 41 is performed in a region D in which the accelerator opening degree at the fuel cut recovery is equal to or smaller than the predetermined opening degree (APO1), and in which the vehicle speed is equal to or lower than a second vehicle speed (VSP2) higher than the first vehicle speed (VSP1). The region D includes the region C. That is, the vehicle speed in which the slip engagement control is performed is enlarged from the first vehicle speed (VSP1) to the second vehicle speed (VSP2). With this, it is possible to effectively suppress the shock at the fuel cut recovery in the region D.

That is, the shock generated in the vehicle is larger as the generation torque of the internal combustion engine 1 at the fuel cut recovery is larger. Accordingly, when the generation torque of the internal combustion engine 1 at the fuel cut recovery becomes large by the forcible regeneration of the GPF 18, the shock at the fuel cut recovery is easy to become apparent even in the high speed region. In this embodiment, when the generation torque of the internal combustion engine 1 at the fuel cut recovery becomes large by the forcible regeneration of the GPF 18, it is possible to suppress the shock by enlarging the region in which the slip engagement control is performed, to the higher vehicle speed side.

The slip engagement control of the lockup clutch 41 is with the demerits such as the deterioration of the acceleration response, and the deterioration of the fuel economy. Accordingly, it is desirable to perform the slip engagement control in the minimum region. In a case in which the excessive slippage is generated when the generation torque of the internal combustion engine 1 at the fuel cut recovery is large, the demerits such as the deterioration of the fuel economy become more remarkable. However, in the present invention, the target slip engagement hydraulic pressure is set in accordance with the torque of the internal combustion engine 1 generated by the fuel cut recovery as described above. Accordingly, it is possible to generate the appropriate slippage at the increase of the torque of the internal combustion engine 1 by the fuel cut recovery, and to avoid the excessive slippage. Therefore, it is possible to minimize the deterioration of the fuel economy, and to enlarge the slip engagement control region to the high vehicle speed side.

Besides, in the example of FIG. 4, it is determined whether or not the slip engagement control is performed based on the accelerator opening degree and the vehicle speed at the fuel cut recovery. However, the slip engagement control of the lockup clutch 41 may be performed when the accelerator opening degree at the fuel cut recovery is in the predetermined accelerator opening degree, irrespective of the vehicle speed.

Moreover, in the example of FIG. 4, the predetermined accelerator opening degree (APO1) determining the driving region in which the slip engagement control is performed is constant. However, the upper limit accelerator opening degree to perform the slip engagement control may be varied in accordance with the vehicle speed.

Furthermore, the accelerator opening degree and the vehicle speed to determine the driving region to perform the slip engagement control may be varied in accordance with the compression ratio of the internal combustion engine 1 (for example, in a case of a variable compression ratio engine), and the gear ratio of the transmission (for example, a case of the stepped transmission).

Moreover, in the example of FIG. 4, the generation torque of the internal combustion engine 1 at the fuel cut recovery is explained as the two stages of the execution and nonexecution of the forcible regeneration of the GPF 18. However, the generation torque is separated into multiple stages. The enlargement of the region may be more finely performed.

The increase of the generation torque of the internal combustion engine 1 at the fuel cut recovery is generated by the stop of the exhaust gas recirculation (EGR), in addition to the above-described forcible regeneration of the GPF 18.

The invention claimed is:
1. A control method for an internal combustion engine for a vehicle configured to engage a lockup clutch during a fuel cut to decrease a lockup hydraulic pressure when a fuel cut recovery condition is satisfied to bring the lockup clutch to a slip engagement, and to perform a fuel cut recovery in the slip engagement state, the control method comprising:

estimating a torque of the internal combustion engine generated by the fuel cut recovery when the fuel cut recovery condition is satisfied; and decreasing a decrease amount of the lockup hydraulic pressure as the torque is greater.

2. The control method of the internal combustion engine for the vehicle as claimed in claim 1, wherein a target slip engagement hydraulic pressure is set based on the torque; and the lockup hydraulic pressure is gradually decreased to the target slip engagement hydraulic pressure after the satisfaction of the fuel cut recovery condition.

3. A control method for an internal combustion engine for a vehicle configured to engage a lockup clutch during a fuel cut to decrease a lockup hydraulic pressure when a fuel cut recovery condition is satisfied to bring the lockup clutch to a slip engagement, and to perform a fuel cut recovery in the slip engagement state, the control method comprising:

estimating a torque of the internal combustion engine generated by the fuel cut recovery when the fuel cut recovery condition is satisfied; and decreasing a decrease amount of the lockup hydraulic pressure as the torque is greater;

wherein a fuel injection restart execution timing after the satisfaction of the fuel cut recovery condition is set to an earlier timing as the torque is greater.

4. A control method for an internal combustion engine for a vehicle configured to engage a lockup clutch during a fuel cut to decrease a lockup hydraulic pressure when a fuel cut recovery condition is satisfied to bring the lockup clutch to a slip engagement, and to perform a fuel cut recovery in the slip engagement state, the control method comprising:

estimating a torque of the internal combustion engine generated by the fuel cut recovery when the fuel cut recovery condition is satisfied; and decreasing a decrease amount of the lockup hydraulic pressure as the torque is greater;

wherein when the fuel cut and the fuel cut recovery are performed while a regeneration of an exhaust particulate filter provided to an exhaust system of the internal combustion engine is performed; and the torque is estimated to include an additional torque according to the regeneration.

5. A control method for an internal combustion engine for a vehicle configured to engage a lockup clutch during a fuel cut to decrease a lockup hydraulic pressure when a fuel cut recovery condition is satisfied to bring the lockup clutch to a slip engagement, and to perform a fuel cut recovery in the slip engagement state, the control method comprising:

estimating a torque of the internal combustion engine generated by the fuel cut recovery when the fuel cut recovery condition is satisfied; and decreasing a decrease amount of the lockup hydraulic pressure as the torque is greater;

wherein a vehicle driving region in which the slip engagement control of the lockup clutch at the fuel cut recovery is performed is previously set based on an accelerator opening degree and a vehicle speed at the fuel cut recovery; and the vehicle driving region in which the slip engagement control is performed is enlarged to the high vehicle speed side when the torque of the internal combustion engine generated by the fuel cut recovery is large.

6. A control device of an internal combustion engine for a vehicle which includes an accelerator opening degree sensor, a fuel injection device, and a hydraulic pressure control section configured to control a lockup hydraulic pressure supplied to a lockup clutch, and which is configured to perform a fuel cut when an accelerator opening degree becomes zero during a traveling of the vehicle, and to restart a fuel injection when a predetermined fuel cut recovery condition is satisfied, the control device comprising, the control device configured to bring the lockup clutch to an engagement state during the fuel cut, to estimate a torque of the internal combustion engine generated by the fuel cut recovery when the fuel cut recovery condition is satisfied, to decrease the lockup hydraulic pressure by a decreasing amount which is smaller as the torque is greater to bring the lockup clutch to the slip engagement, and to perform the fuel injection restart in the slip engagement state.

* * * * *